Dec. 18, 1951  O. E. DUDLEY  2,578,678
UNDERWATER SOUND SYSTEM
Filed Jan. 5, 1946
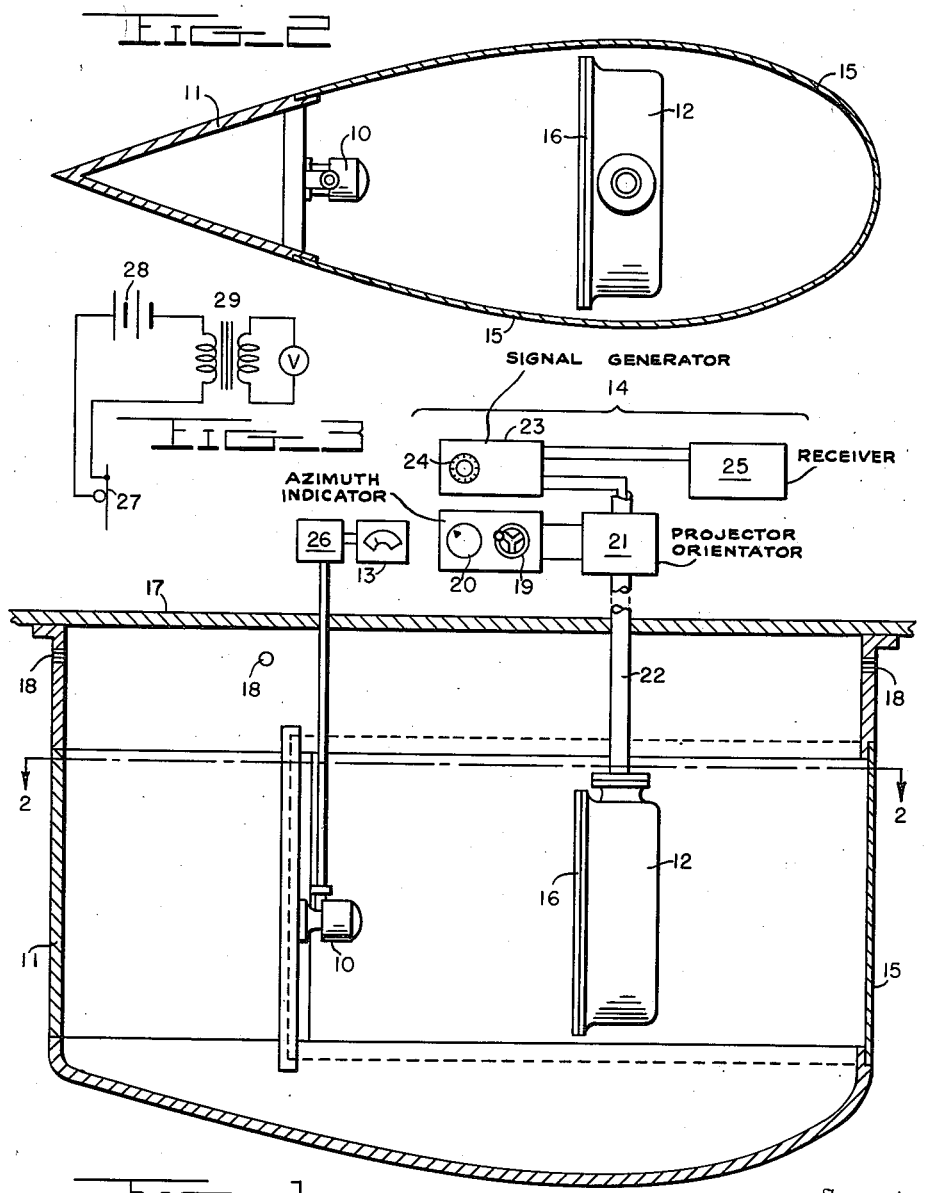
Inventor
OSCAR E. DUDLEY Patented Dec. 18, 1951

2,578,678

UNITED STATES PATENT OFFICE 2,578,678

UNDERWATER SOUND SYSTEM

Oscar E. Dudley, United States Navy

Application January 5, 1946, Serial No. 639,402

1 Claim. (Cl. 177—386)

(Granted under the act of March 3, 1883, as amended April 30, 1928; 370 O. G. 757)

The present invention relates in general to underwater sound projection systems, and more particularly to a means for and method of ascertaining and correcting deviations from most desirable performance obtainable with a given equipment.

An object of the invention is to provide means for determining that frequency adjustment of the driver of an underwater sound projection system which is necessary to effect maximum possible sound output of the projector.

Another object is the provision of means for readily determining and discrepancy between the actual direction of the sound beam underwater and the indication registered by a remote, bearing direction indicator.

In general the invention provides a system whereby personnel may verify at any time, (1) that the frequency of the driver of the echo-ranging equipment is adjusted for maximum transmitted signal, (2) that the transmitted signal level is normal, and (3) that the sound beam azimuth indicator on the projector training shaft is correctly set.

Other objects and advantages of the invention will become apparent from a perusal of the following specification and the drawings accompanying the same.

In the drawings:

Fig. 1 is a diagram showing in vertical longitudinal section an underwater sound dome housing a projector to which the invention is applied.

Fig. 2 is a section on the line 2—2 of Fig. 1.

Fig. 3 is a schematic circuit diagram of a modification.

The system comprises in general a small microphone or receiver element 10 mounted within and near the aft end of the underwater sound dome 11 which houses the electro-sonic projector element 12 of an underwater echo ranging system. An indicator element 13 controlled by the microphone element 10 is located near the inboard control equipment 14 for the projector.

A sound window 15 of relatively thin sheet metal forms a portion of the front and side walls of the dome. While the window 15 is here shown as a curved panel of sheet metal, it will be understood that it may be formed of any known or other suitable material such as reinforced sound-rubber.

While the projector 12 is here shown trained aft, that is with the front or beam-transmitting side 16 facing aft, which is its position for certain tests with which the present invention is concerned, it will be understood that, in general use, the front of the projector is directed generally forward, or to one side, according to the direction in which it is desired to project the sound beam and receive incoming sound waves, through the sound window.

The echo-ranging equipment may be of any known or other suitable type. That here shown comprises the underwater sound dome 11 mounted below the hull 17 of a ship, the dome in the present instant being one of the free-flooding type having flooding openings 18 for maintaining the dome filled with sea water. Control equipment 14 situated within the ship comprises the usual or other suitable training control means 19 and azimuth indicator 20, the control means 19 operating through suitable driving means 21 and the usual hollow shaft 22 to effect orientation of the projector in azimuth. The control equipment 14 also includes a suitable, tunable driver element 23 providing the driving signal current for the projector 12, the driver being provided with the usual tuning device 24 constituting means manipulated by an operator for varying the frequency of the driver output, signalling-current for operating the projector. Also associated with the control equipment is a receiver element 25 of any known or other suitable type for indicating range and azimuth.

The monitoring receiver or microphone 10 may be of the piezo-electric crystal types, and the indicator 13 a D.-C. microammeter, the two connected through a suitable rectifier 26 for example a copper-oxide rectifier. It will be understood, however, that any other known form of indicator may be substituted for the elements 13 and 26, for example an electronic voltmeter.

Inasmuch as for many uses of the invention, the monitoring portion of the system may be any means capable of indicating relative sound intensities at a given point within the dome, the receiver element 10 and its indicating means, 13, 26, may be of any known or other suitable form of sound responsive device and indicator.

For example, as indicated diagrammatically in the modification of Fig. 3, the receiver may take the form of a simple carbon microphone 27 connected in series with a battery 28 and the primary of a transformer 29, in the manner of a classic battery telephone transmitter, and the indicator, an alternating current, voltmeter V connected to the transformer secondary.

In operation, the operator desiring to determine whether the frequency of the driver is adjusted for maximum transmitted signal, operates the training control means 19 to train the projector 12 toward the rear upon the receiver element 10, the operator being apprised of the position of the projector by the azimuth indicator 20. This brings the parts into the relative position indicated in the drawings with the receiver 10 directly in the path of the sound beam directed aft from the projector 12 through the fluid (not shown) filling the dome. The operator now manipulates the tuning control device 24 of the driver 23 to bring the driver to that frequency which produces the maximum response in the indicator 13.

A determination of whether the transmitted signal level is normal may be obtained by comparison of the intensity of the maximum indication obtainable at 13 with that established as the normal, from previous experience with the same apparatus.

To determine whether the sound beam azimuth indicator 20 is in agreement with the actual direction of the sound beam projected by the projector 12, the operator, leaving the driver at a given frequency and power output, operates the training control member 19 to face the projector 12 in a general aft direction, and further varies its position in this general direction to ascertain that position in which a maximum response indication is obtained at the indicator unit 13. At this adjustment the azimuth indicator 20 should indicate the direction of the beam as directly astern. If the indication is otherwise, then the connection between indicator and projector may be aligned in any known or other suitable manner.

It will be clear from the above that due to the peculiar cooperative combination and arrangement of projector, receiver and liquid filled, common housing dome, all of the monitoring tests may be satisfactorily made with the ship under way.

While certain specific embodiments of the invention have been herein described for the sake of disclosure it is to be understood that the invention is not limited to such specific embodiments but contemplates all such modifications and variations thereof as fall fairly within the scope of the appended claim.

The invention described herein may be manufactured and used by or for the Government of the United States of America for governmental purposes without the payment of any royalties thereon or therefor.

What is claimed is:

In an underwater ship-carried sound range and azimuth indicating system, an underwater sound dome streamlined by a taper in volume from front to rear for movement under water with minimum turbulence and having flooding openings fore and aft to render the dome free-flooding with the surrounding water, a sound beam projector mounted in the dome below the level of the flooding openings near the fore portion of the dome, training means for training the projector in azimuth from front to rear and a sound responsive receiver element mounted in the tapered rear end of the dome below the level of the flooding openings in fixed relation to the dome directly astern of the projector in the direction of the streamlining of the dome, said dome maintaining a captive body of water between the projector and receiver substantially stationary relative to the projector receiver and dome, whereby with the projector trained toward the receiver sound waves may be transmitted for test purposes from the projector to the receiver through relatively still water with the ship under way.

OSCAR E. DUDLEY.

REFERENCES CITED

The following references are of record in the file of this patent:

UNITED STATES PATENTS

| Number | Name | Date |
|---|---|---|
| 2,166,162 | Kunze | July 18, 1939 |
| 2,398,335 | Theis et al. | Apr. 9, 1946 |
| 2,417,830 | Keller | Mar. 25, 1947 |
| 2,435,253 | Turner | Feb. 3, 1948 |
| 2,456,598 | Schuck | Dec. 14, 1948 |

FOREIGN PATENTS

| Number | Country | Date |
|---|---|---|
| 297,998 | Germany | Apr. 1, 1921 |